United States Patent [19]

Bardo

[11] Patent Number: 4,976,895
[45] Date of Patent: Dec. 11, 1990

[54] LIGHTWEIGHT COOLING TOWER WITH FAN SUPPORTED BY A VERTICAL LIQUID SUPPLY PIPE

[75] Inventor: Charles J. Bardo, Ft. Worth, Tex.

[73] Assignee: Ceramic Cooling Tower Company, Fort Worth, Tex.

[21] Appl. No.: 451,521

[22] Filed: Dec. 15, 1989

[51] Int. Cl.⁵ ............................................... B01F 3/04
[52] U.S. Cl. .............................. 261/108; 261/DIG. 11
[58] Field of Search ......................... 261/DIG. 11, 108

[56] References Cited

U.S. PATENT DOCUMENTS

| | | | |
|---|---|---|---|
| 3,318,586 | 5/1967 | Meredith | 261/DIG. 11 |
| 3,596,884 | 8/1971 | Murphy | 261/DIG. 11 |
| 3,739,556 | 6/1973 | Waters | 261/DIG. 11 |
| 4,094,937 | 6/1978 | Bodick et al. | 261/DIG. 11 |
| 4,328,176 | 5/1982 | Alt et al. | 261/DIG. 11 |
| 4,382,046 | 5/1983 | Frohwerk | 261/DIG. 11 |
| 4,416,836 | 11/1983 | Sinek | 261/DIG. 11 |
| 4,422,983 | 12/1983 | Bardo et al. | 261/DIG. 11 |
| 4,543,218 | 9/1985 | Bardo et al. | 261/DIG. 11 |
| 4,637,903 | 1/1987 | Bardo et al. | 261/DIG. 11 |
| 4,788,013 | 11/1988 | Kinney, Jr. et al. | 261/DIG. 11 |

Primary Examiner—Tim Miles

[57] ABSTRACT

A lightweight water cooling tower is formed by a fiberglass reinforced basin and fiberglass reinforced side panels. A liquid distribution system in the cooling tower is supplied with liquid by a vertically extending liquid supply pipe, and a fan is supported by the liquid supply pipe.

12 Claims, 1 Drawing Sheet

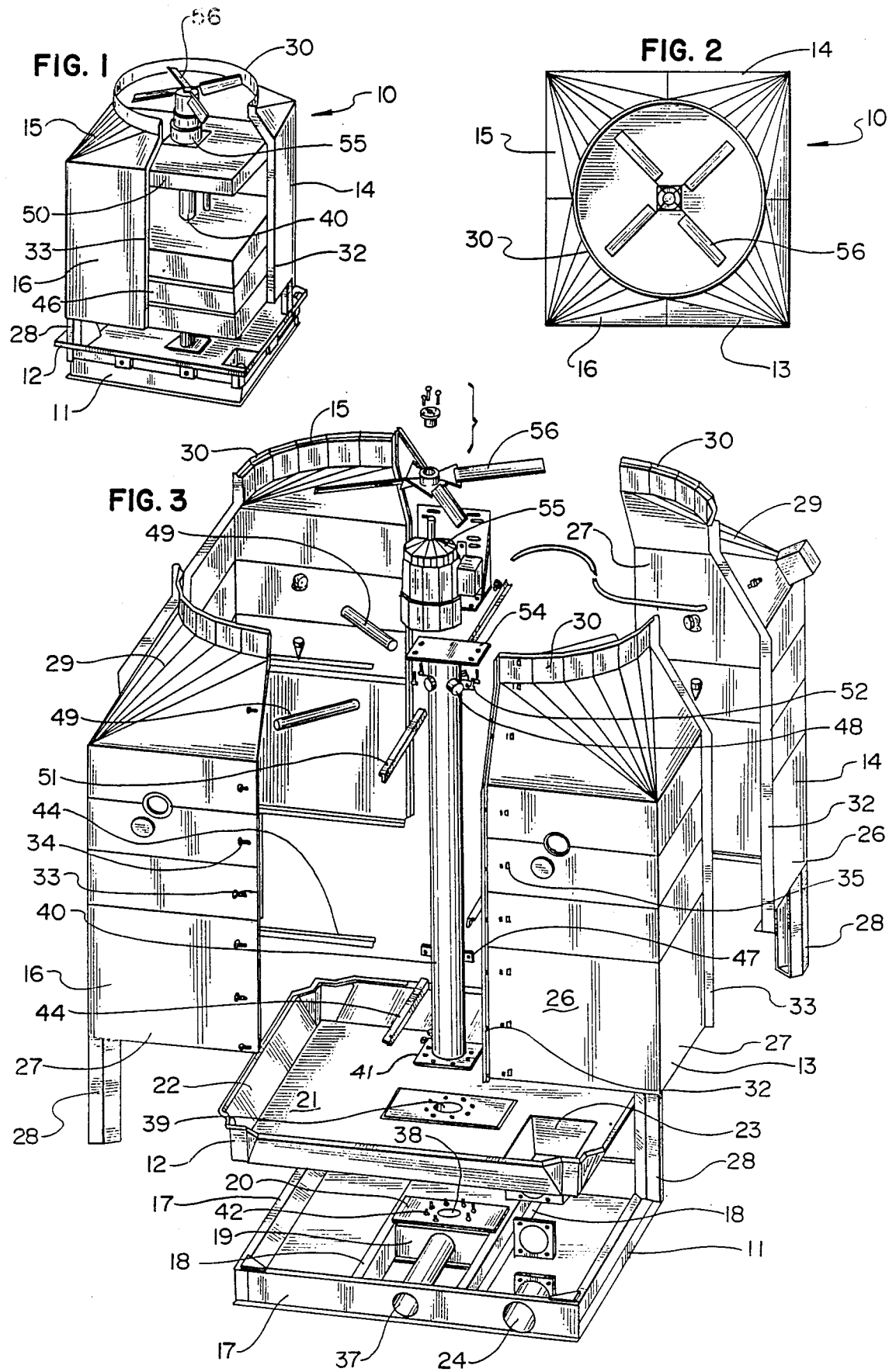

LIGHTWEIGHT COOLING TOWER WITH FAN SUPPORTED BY A VERTICAL LIQUID SUPPLY PIPE

BACKGROUND

This invention relates to a liquid cooling tower, and more particularly, to a lightweight liquid cooling tower which is formed by a fiberglass reinforced resin basin and fiberglass reinforced resin side panels and in which the fan is supported by a vertical liquid supply pipe.

Cooling towers are used to cool liquid by contact with air. The liquid is allowed to flow downwardly through the tower, and a counter current flow of air is drawn through the falling liquid by various means. A common application for liquid cooling towers is for cooling water (dissipating waste heat) used in electrical generating and process plants and industrial and institutional air conditioning systems.

Most cooling towers include a tower structure which encloses a fill material. The fill material has spaces through which the liquid flows downwardly and the air flows upwardly to provide heat and mass transfer between the liquid and the air. The tower structure may be formed from concrete, metal, or other material.

Metal parts of cooling towers can be corroded by the local atmosphere and/or the liquid which is being cooled. Concrete is very durable, but concrete towers are expensive and heavy. Many cooling towers are located on roofs of buildings, and the weight of a concrete cooling tower can cause building design problems. Co-owned U.S. Pat. No. 4,382,046 refers to a cooling tower with concrete walls which are supported above a concrete water basin by concrete supports.

Plastic parts are resistant to corrosion, but plastic parts ordinarily world not provide enough strength to support the fill material and the weight of the tower itself. One well-known type of fill material which is used by Ceramic Cooling Towers of Fort Worth, TX, consists of stacked layers of open-celled clay tiles. This fill material can weight 60,000 to 70,000 pounds for a conventional size air conditioning cooling tower. Structural parts of a cooling tower must not only support the weight of the fill material but must also resist wind forces and should be designed to withstand earthquake loads.

Co-owned U.S. Pat. No. 4,422,983 describes a cooling tower formed from fiberglass reinforced polyester resin panels and beams. All of the structural parts of the tower are fiberglass reinforced polyester resin except the cast iron lintels which are used to support the fill material and stainless steel bolts which connect the fiberglass reinforced polyester resin parts.

Co-owned U.S. Pat. No. 4,543,218 describes a cooling tower in which the weight of the tower and the fill material is supported by precast concrete support legs and the basin is concrete. A liquid supply pipe extends vertically upwardly through the fill material and supports the weight of the fan.

Co-owned U.S. Pat. No. 4,637,903 describes a lightweight cooling tower in which all of the structural components are formed from fiberglass reinforced polyester resin, and the fill material is supported directly by the basin.

The cooling towers described in the foregoing patents have many advantages over prior cooling towers. However, many customers of cooling; towers continue to purchase wood towers. The advantage of a wood tower is that the wood is inexpensive and is easy to fabricate and ship. However, wood towers are difficult to assemble and are prone to rotting. The average life of a wood tower is only about 7 to 10 years, and maintenance costs are high.

SUMMARY OF THE INVENTION

The invention provides a cooling tower which is inexpensive and lightweight yet durable. The cooling tower is formed by a fiberglass basin and fiberglass side panels. A fan and fan motor is supported by vertical liquid supply pipe. Lightweight plastic fill material is supported by horizontal braces which are attached to the liquid supply pipe and the side panels.

DESCRIPTION OF THE DRAWING

The invention will be explained in conjunction with the attached drawing, in which:

FIG. 1 is a perspective view, partially broken away, of a cooling tower formed in accordance with the invention;

FIG. 2 is a top plan view of the cooling tower; and

FIG. 3 is an exploded perspective view of the cooling tower.

DESCRIPTION OF SPECIFIC EMBODIMENT

The numeral 10 refers generally to a mechanical draft type cooling tower which is used, for example, for cooling water for an air conditioning system. The cooling tower includes a base 11, a basin 12, and four side panels 13, 14, 15, and 16.

The horizontally extending base 11 supports the weight of the cooling tower. The particular base illustrated is formed by steel beams, although the base could also be provided by a concrete pad. Four steel I beams 17 form a rectangular periphery, and two inside I beams 18 are positioned adjacent the center of the base. A pair of crossing I beams 19 extend between the beams 18, and a metal plate 20 is supported by the beams 18 and 19.

The basin 12 is formed from fiberglass reinforced polyester resin and includes a flat bottom 21 and four side walls 22. The basin has the same shape as the base, and the sides of the basin are supported by the side beams 17 of the base. A sump 23 is formed in the bottom of the basin for facilitating withdrawing water from the basin. A water return pipe 24 is connected to the sump and extends through one of the side beams 17 of the base.

The four side panels 13–16 are also formed of fiberglass reinforced polyester resin. Each side panel includes a pair of side panel portions 26 and 27 which extend at a right angle to form a corner of the tower and a corner post 28 which extends downwardly from the corner. A top portion 29 extends upwardly and inwardly from the side panel portions and terminates in an arcuate flange 30 which forms one-quarter of a cylinder.

Attaching flanges 32 and 33 extend along the vertical edges of the side panel portions 26 and 27 and are provided with bolt openings. Adjacent side panels are connected together by mating the flanges 32 and 33 and fastening them with bolts 34 and nuts 35. The four corner posts 28 nest in the corners of the basin 12 and are supported by the basin and the base 11.

Liquid to be cooled is supplied by a pipe 37 in the base, and liquid flows upwardly through an opening 38 in the metal plate 20 and an opening 39 in the basin. A vertical liquid supply pipe 40 is aligned with the openings 38 and 39 and includes a base plate 41 which is clamped against the basin by bolts 42 which extend upwardly from the metal plate 20 through bolt holes in the basin. Gaskets may be positioned between the plate 20 and the basin and between the basin and the plate 41 to provide a tight seal.

Four support braces 44 extend horizontally between the vertical liquid supply pipe 40 and the side panels for supporting fill material 46 (FIG. 1) within the cooling enclosure formed by the side panels. One end of each brace is attached to a flange 47 on the pipe 40, and the other end is inserted between the mating edge flanges 32 and 33 of the side panels and secured by one of the bolts 34.

The particular fill material 46 illustrated in FIG. 1 is conventional and well known. The fill material is formed by a plurality of spaced-apart vertically extending sheets of rigid plastic. Each plastic sheet is provided with ribs which contact adjacent sheets to provide a tortuous path for water which flows downwardly from the water distribution system and for air which is drawn upwardly through the porous fill material by the fan. Plastic fill material is not as durable as the ceramic tile which is described in U.S. Pat. Nos. 4,422,983, 4,543,218, and 4,637,903. However, plastic fill is lightweight and can be supported by the braces 44 and the side panels 13-16.

The vertical liquid supply pipe 40 is provided with four outlets 48 at its upper end, and liquid distribution pipes 49 are connected to the outlets. The liquid distribution pipes are equipped with conventional spray nozzles (not shown) for spraying the liquid which is to be cooled onto the top of the fill material 46.

A conventional drift eliminator 50 (FIG. 1) is supported above the liquid distribution pipes by horizontally extending support braces 51 (FIG. 2). The braces 51 are attached to flanges 52 on the liquid supply pipe 40 and to the vertical edge flanges 32 and 33 of the side panels by the bolts which join the flanges. The drift eliminator is also conventional and is formed by spaced-apart plastic sheets which form a tortuous path for the upwardly flowing air. The drift eliminator is intended to collect moisture in the upwardly flowing air and reduce the amount of liquid which escapes from the cooling enclosure.

A horizontal plate 54 is mounted on top of the liquid supply pipe 40, and a fan motor 55 is bolted to the plate. The fan motor drives a fan 56 which is positioned within the cylindrical side wall which is formed by the four arcuate flanges 30 of the four side panels.

The vertical liquid supply pipe 40 and the top and bottom plates 41 and 54 are metal and support the entire weight of the fan and fan motor. The liquid supply pipe in turn is supported by the base 11, particularly by the plate 20 and the beams 18 and 19. The fiberglass side panels 13-16 are therefore not required to withstand any of the load of the fan or fan motor. Since the portion of the basin 12 which bears against the plate 41 is supported by the plate 20 of the base, the basin also is not required to support the load of the fan or fan motor or the weight of the water distribution system.

The operation of the cooling tower is conventional Liquid to be cooled is pumped up the vertical liquid supply pipe 40 and is sprayed onto the top of the porous fill material 46. The fan 56 draws air into the enclosure of the cooling tower through the openings between the basin 12 and the bottom edges of the side panels and upwardly through the fill material As the liquid flows downwardly through the fill material, heat/mass exchange occurs between the liquid and the air. The cooled liquid is collected by the basin 12 and pumped back to the air conditioning system or other apparatus which requires cool water.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. In a water cooling tower having:
 a basin formed from fiberglass reinforced resin having a bottom wall and an upwardly extending side wall,
 a plurality of side panels supported by the basin and extending upwardly therefrom, the side panels being formed from fiberglass reinforced resin and forming a cooling enclosure with an opening in the top,
 porous means for heat/mass exchange means supported within the cooling enclosure, the improvement comprising:
 a horizontally extending base below the basin and supporting the basin, the base including a plurality of beams supporting the bottom wall of the basin below the side walls thereof and a central beam below the central portion of the bottom wall,
 a liquid supply pipe supported by the central beam and extending vertically upwardly within the center of the cooling enclosure,
 liquid distribution means above the heat/mass exchange means and connected to the liquid supply pipe for supplying liquid to the heat/mass exchange means, and
 a fan above the liquid distribution means and supported by the liquid supply pipe for drawing air through the heat/mass exchange means.

2. The cooling tower of claim 1 including a plurality of support braces extending between the liquid supply pipe and the side panels and connected thereto for supporting the heat/mass exchange means.

3. The cooling tower of claim 1 including a plurality of support braces extending between the liquid supply pipe and the side panels above the liquid distribution means, and drift eliminator means supported by the braces for reducing the amount of liquid which escapes through the open top of the cooling enclosure.

4. The cooling tower of claim 1 in which the bottom wall of the basin is flat and the beams of the base lie in the same plane.

5. The cooling tower of claim 1 in which the bottom wall of the basin is provided with an opening and the base includes a pipe which communicates with the opening, the liquid distribution pipe being connected to the opening in the bottom wall of the basin.

6. The cooling tower of claim 1 in which there are four of said side panels, each side panel including a corner post which is supported by the basin and a pair of perpendicularly related panel portions which are supported by the corner post, the panel portions of adjacent side panels having vertical edges which are connected together to form the sides of the cooling enclosure.

7. The cooling tower of claim 6 in which each of said side panels includes a top portion which extends inwardly from the panel portions and forms a portion of the periphery of the top opening.

8. The cooling tower of claim 6 including a plurality of horizontally extending support braces which are connected to the liquid supply pipe and to the vertical edges of adjacent panel portions for supporting the heat/mass exchange means.

9. The cooling tower of claim 6 including a plurality of horizontally extending support braces which are connected to the liquid supply pipe and to the vertical edges of adjacent panel portions above the liquid distribution means, and drift eliminator means supported by the braces for reducing the amount of liquid which escapes through the open top of the cooling enclosure.

10. The cooling tower of claim 1 in which the base includes a second central beam adjacent the first central beam and a plate supported by the central beams, the plate supporting the liquid distribution pipe.

11. The cooling tower of claim 10 in which the bottom wall of the basin and the plate are provided with aligned openings and the base includes a pipe which communicates with the openings, the liquid distribution pipe being connected to the opening in the bottom wall of the basin.

12. The cooling tower of claim 11 in which the liquid distribution pipe includes a flange which is supported by the bottom wall of the basin and by the plate, and bolts connecting the flange and the plate.

* * * * *